(12) United States Patent
Shroff et al.

(10) Patent No.: US 11,673,467 B2
(45) Date of Patent: Jun. 13, 2023

(54) MULTIPLE GAS TANK ASSEMBLY WITH INDIVIDUAL PRESSURE MONITORING

(71) Applicant: The Heil Co., Chattanooga, TN (US)

(72) Inventors: Nitesh Shroff, Chattanooga, TN (US); Stanley L. Maroney, Attalla, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/557,750

(22) Filed: Dec. 21, 2021

(65) Prior Publication Data

US 2022/0250467 A1    Aug. 11, 2022

Related U.S. Application Data

(63) Continuation of application No. 16/577,875, filed on Sep. 20, 2019, now Pat. No. 11,207,974.

(60) Provisional application No. 62/734,434, filed on Sep. 21, 2018.

(51) Int. Cl.
| | | |
|---|---|---|
| *B60K 15/07* | (2006.01) | |
| *B60K 15/077* | (2006.01) | |
| *F02D 19/02* | (2006.01) | |
| *B60K 15/073* | (2006.01) | |
| *B60K 15/03* | (2006.01) | |

(52) U.S. Cl.
CPC ............ *B60K 15/07* (2013.01); *B60K 15/073* (2013.01); *B60K 15/077* (2013.01); *F02D 19/027* (2013.01); *B60K 2015/03026* (2013.01)

(58) Field of Classification Search
CPC .... B60K 15/07; B60K 15/073; B60K 15/077; B60K 2015/03026; F02D 19/027; B60Y 2200/144

USPC ...................................................... 137/899.4
See application file for complete search history.

(56) References Cited

U.S. PATENT DOCUMENTS

| | | |
|---|---|---|
| 2,574,177 A | 11/1951 | Godet |
| 2,895,560 A | 7/1959 | Lynn |
| 3,134,603 A | 5/1964 | Rogers |
| 3,565,201 A | 2/1971 | Petsinger |
| 5,330,031 A | 7/1994 | Hill et al. |
| 5,527,098 A | 6/1996 | McKinney et al. |
| 5,549,096 A | 8/1996 | Swenson et al. |
| 5,554,976 A | 9/1996 | Miyauchi et al. |
| 5,558,246 A | 9/1996 | Ross, Jr. |
| 5,611,316 A | 3/1997 | Oshima et al. |
| 5,658,117 A | 8/1997 | McKinney et al. |

(Continued)

FOREIGN PATENT DOCUMENTS

| | | | |
|---|---|---|---|
| CN | 107388030 | 11/2017 | |
| GB | 2172985 A | * 10/1986 | ............. B60K 15/07 |
| JP | 2008137643 | 6/2008 | |

OTHER PUBLICATIONS

[No Author], "Momentum CNG Fuel System," available no later than Sep. 21, 2018, 1 page.

(Continued)

*Primary Examiner* — Mahmoud Gimie
(74) *Attorney, Agent, or Firm* — Fish & Richardson P.C.

(57) ABSTRACT

This disclosure describes an assembly for gas (e.g., compressed natural gas) storage. The assembly includes multiple gas storage tanks, with each tank coupled to a separate sub-assembly that includes a pressure gauge, shutoff valve, and pressure relief device (PRD), providing for independent pressure monitoring, shutoff, and pressure relief for each of the tanks.

20 Claims, 8 Drawing Sheets

(56) References Cited

U.S. PATENT DOCUMENTS

| | | | |
|---|---|---|---|
| 5,787,920 A | 8/1998 | Krasnov |
| 5,829,418 A | 11/1998 | Tamura et al. |
| 6,041,762 A | 3/2000 | Sirosh et al. |
| 6,095,367 A | 8/2000 | Blair et al. |
| 6,112,760 A | 9/2000 | Scott et al. |
| 6,213,243 B1 | 4/2001 | Studebaker et al. |
| 6,257,360 B1 | 7/2001 | Wozniak et al. |
| 6,268,803 B1 | 7/2001 | Gunderson et al. |
| 6,279,612 B1 | 8/2001 | Warth |
| 6,291,770 B1 | 9/2001 | Casperson |
| 6,367,573 B1 | 4/2002 | Scott |
| 6,390,075 B1 | 5/2002 | Yamazaki et al. |
| 6,401,698 B1 | 6/2002 | Yamazaki et al. |
| 6,412,588 B1 | 7/2002 | Scott et al. |
| 6,418,962 B1 | 7/2002 | Wozniak et al. |
| 6,439,334 B1 | 8/2002 | Myers et al. |
| 6,467,466 B1 | 10/2002 | Maekawa et al. |
| 6,481,751 B1 | 11/2002 | Davis, Jr. et al. |
| 6,502,660 B1 | 1/2003 | Scott et al. |
| 6,527,075 B1 | 3/2003 | Izuchukwu et al. |
| 6,532,684 B1 | 3/2003 | Tunnev et al. |
| 6,595,569 B1 | 7/2003 | McKinney |
| 6,957,171 B2 | 10/2005 | White et al. |
| 7,137,474 B2 | 11/2006 | Yokote |
| 7,159,738 B2 | 1/2007 | Luongo |
| 7,270,209 B2 | 9/2007 | Suess |
| 7,322,345 B2 | 1/2008 | Saito et al. |
| 7,426,935 B2 | 9/2008 | Schwan et al. |
| 7,543,667 B2 | 6/2009 | Hwang et al. |
| 7,624,753 B2 | 12/2009 | Suess et al. |
| 7,648,787 B2 | 1/2010 | Suematsu et al. |
| RE41,142 E | 2/2010 | Blair et al. |
| 7,882,587 B2 | 2/2011 | Tagliaferri |
| 7,976,067 B2 | 7/2011 | Naganuma |
| 8,020,430 B2 | 9/2011 | Farnsworth |
| 8,443,820 B2 | 5/2013 | Ulrey et al. |
| 8,539,972 B2 | 9/2013 | Xu |
| 8,690,191 B2 | 4/2014 | Gentry |
| 9,064,401 B2 | 6/2015 | Grant et al. |
| 9,252,440 B2 | 2/2016 | Yoshida et al. |
| 9,284,895 B2 | 3/2016 | Naidu et al. |
| 9,454,856 B2 | 9/2016 | Ahmad et al. |
| 9,533,569 B2 | 1/2017 | McKinney |
| 9,579,969 B2 | 2/2017 | Crist et al. |
| 9,592,731 B2 | 3/2017 | Hanlin et al. |
| 9,694,671 B2 | 7/2017 | Wildarube et al. |
| 9,850,845 B2 | 12/2017 | Sloan et al. |
| 9,981,551 B2 | 5/2018 | McKinney |
| 10,914,401 B2 | 2/2021 | Shroff et al. |
| 2001/0032628 A1 | 10/2001 | Goto et al. |
| 2001/0032747 A1 | 10/2001 | DePoy et al. |
| 2002/0096212 A1 | 7/2002 | Yamada et al. |
| 2004/0091345 A1 | 5/2004 | Flerchinger et al. |
| 2007/0023215 A1 | 2/2007 | Ueda |
| 2008/0098562 A1 | 5/2008 | Tagliaferri |
| 2008/0156809 A1 | 7/2008 | Mizuno et al. |
| 2010/0047047 A1 | 2/2010 | Mayer et al. |
| 2010/0078244 A1 | 4/2010 | Pursifull |
| 2010/0252353 A1 | 10/2010 | Tsubokawa |
| 2011/0288738 A1 | 11/2011 | Donnelly |
| 2012/0115061 A1 | 5/2012 | Tsubokawa |
| 2012/0228307 A1 | 9/2012 | Simmons |
| 2012/0280481 A1 | 11/2012 | Gentry |
| 2013/0092436 A1 | 4/2013 | Silc et al. |
| 2013/0092694 A1 | 4/2013 | Green |
| 2013/0104997 A1 | 5/2013 | Harper |
| 2013/0199499 A1 | 8/2013 | Pursifull |
| 2013/0199863 A1 | 8/2013 | Robbins |
| 2013/0238226 A1 | 9/2013 | Slaynnaker et al. |
| 2014/0061266 A1 | 3/2014 | Milton |
| 2014/0069972 A1 | 3/2014 | Willemsen |
| 2014/0109974 A1 | 4/2014 | Zoz |
| 2014/0217107 A1 | 8/2014 | Sloan et al. |
| 2014/0367954 A1 | 12/2014 | McKinney |
| 2014/0373531 A1 | 12/2014 | Wong |
| 2015/0112506 A1 | 4/2015 | Hanlin |
| 2015/0129338 A1 | 5/2015 | Green |
| 2016/0023548 A1 | 1/2016 | Crist et al. |
| 2016/0177857 A1 | 6/2016 | Sarikaya et al. |
| 2016/0257196 A1 | 9/2016 | Green |
| 2016/0273472 A1 | 9/2016 | Ariie et al. |
| 2017/0106746 A1 | 4/2017 | McKinney |
| 2017/0158050 A1 | 6/2017 | Crist et al. |
| 2017/0282710 A1 | 10/2017 | Sloan et al. |
| 2017/0297425 A1 | 10/2017 | Wildqrube et al. |
| 2018/0065476 A1 | 3/2018 | McKinney |
| 2018/0111477 A1 | 4/2018 | Sloan et al. |
| 2018/0195638 A1 | 7/2018 | Shroff et al. |
| 2019/0023127 A1 | 1/2019 | McKinney |
| 2020/0094673 A1 | 3/2020 | Shroff et al. |

OTHER PUBLICATIONS

Pehrson et al., "NFPA 52: Vehicular Natural Gas Fuel Systems Code," 2016 ed., Apr. 2016, 78 pages.

Undated photographs taken by Fab Industries (now Agility) of a Labrie Refuse Vehicle With an Auxiliary CNG Holder added to the tailgate (12 pages).

* cited by examiner

TOP TANK ROUTING

FIG. 4

ALL OTHER TANKS ROUTING

MULTIPLE GAS TANK ASSEMBLY WITH INDIVIDUAL PRESSURE MONITORING

CROSS-REFERENCE TO RELATED APPLICATIONS

The application is a continuation of U.S. patent application Ser. No. 16/577,875, titled "Multiple Gas Tank Assembly with Individual Pressure Monitoring," filed on Sep. 20, 2019, now U.S. Pat. No. 11,207,974, which claims priority to U.S. Provisional Patent Application No. 62/734,434, titled "Multiple Gas Tank Assembly with Individual Pressure Monitoring," filed on Sep. 21, 2018. The entire contents of the foregoing applications are hereby incorporated by reference.

SUMMARY

Implementations of the present disclosure are generally directed to a storage assembly. More particularly, implementations of the present disclosure are directed to an assembly including multiple gas storage tanks, with each tank coupled to a separate sub-assembly that includes a pressure gauge, shutoff valve, and pressure relief device (PRD).

In general, an innovative aspect of the subject matter described in this specification can be embodied in a gas storage assembly that includes a plurality of gas storage tanks, each respective gas storage tank coupled to a respective sub-assembly including: a pressure gauge that measures and displays the pressure in the respective gas storage tank; a pressure relief device (PRD) that relieves pressure in the respective gas storage tank; and a shutoff valve that controls the flow of gas to and from the respective gas storage tank.

These and other implementations can each optionally include one or more of the following innovative features: the assembly further includes a cover that at least partly covers at least one side of the assembly, wherein the cover includes an opening to provide visibility to each respective pressure gauge; the gas is compressed natural gas; the assembly is attached to the tailgate of, or anywhere else on, a refuse collection vehicle; the gas is a fuel for a refuse collection vehicle; the sub-assembly further includes a supply line coupled to the respective gas storage tank and configured to supply a flow of gas to and from the respective gas storage tank; the sub-assembly further includes a vent line configured for venting gas from the respective gas storage tank; the pressure relief device is coupled to the vent line; and/or the sub-assembly further includes a port coupled to the respective gas storage tank, and the port is configured to provide a flow of gas to the respective gas storage tank.

Another innovative aspect of the subject matter described in this specification can be embodied in vehicle tank pressure control system that includes multiple pressure gauges, each configured to measure and display the pressure of a respective gas storage tank of a plurality of gas storage tanks mounted on and coupled to a vehicle to supply gas for combustion to propel the vehicle; multiple pressure relief devices (PRD), each PRD coupled to a respective one of the pressure gauges to relieve pressure in a respective one of the plurality of gas storage tanks; and multiple shutoff valves, each shutoff valve coupled to a respective one of the pressure gauges to control a flow of gas to and from a respective one of the gas storage tanks.

These and other implementations can each optionally include one or more of the following innovative features: the system further includes a cover configured to at least partly cover at least one side of a plurality of associated gas storage tanks, and the cover defines one or more openings to provide visibility to the pressure gauges; the system is configured for use with tanks containing compressed natural gas; the system is secured to a tailgate of a refuse collection vehicle; the system is coupled to a drive system of a refuse collection vehicle; the system further includes multiple gas supply lines, each supply line coupled to a respective one of the PRDs for coupling to an associated gas storage tank to supply a flow of gas to and from the associated gas storage tank; the system further includes multiple vent lines, each vent line coupled to a respective one of the PRDs for coupling to an associated gas storage tank and to vent gas from the associated gas storage tank; and/or the system further includes multiple ports, each port coupled to an associated gas storage tank to provide a flow of gas to and from the associated gas storage tank.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to an assembly including multiple gas storage tanks, with each tank coupled to a separate sub-assembly that includes a pressure gauge, shutoff valve, and pressure relief device (PRD). In some implementations, the assembly may be employed to store gas, such as compressed natural gas (CNG), to be used as fuel for the operation of a vehicle such as a refuse collection vehicle (RCV). Implementations may be employed with respect to any suitable type of RCV, with any suitable type of body and/or hopper variants. For example, the RCV may be: an automated side loader (ASL) vehicle, a front loader (e.g., for dumpster type containers) with or without a Curotto-Can™), a rear loader, and/or a roll-off vehicle. The RCV can be employed to collect refuse from residential locations, commercial locations, and/or any other suitable type of location. The RCV can alternatively be described as a garbage truck or a garbage collection vehicle.

Implementations may provide for compliance with the requirements of NFPA 52 (2016 version). Implementations also provide the following advantages. Implementations enable the monitoring of the pressure of each individual tank when the manual tank valve is closed using a dedicated pressure gauge per tank. This contrasts with traditional solutions that employ a single gauge for monitoring the overall pressure of an assembly of multiple tanks, and therefore fail to provide a mechanism for determining the individual tank pressures regardless of tank valve position. Implementations also enable the opening or closing of each individual tank as needed using each tank's dedicated valve. This can be especially useful to dedicate certain tanks' gas supply as a reserve, close off certain tank(s) for shipping, and/or for other purposes. Implementations also enable the defueling of individual and/or multiple tanks as needed instead of defueling all tanks for maintenance purposes. This can be accomplished closing individual tank valves. The above advantages are unavailable in traditional, previously available solutions, which employ a single, common pressure gauge for multiple tanks.

Figure 1:
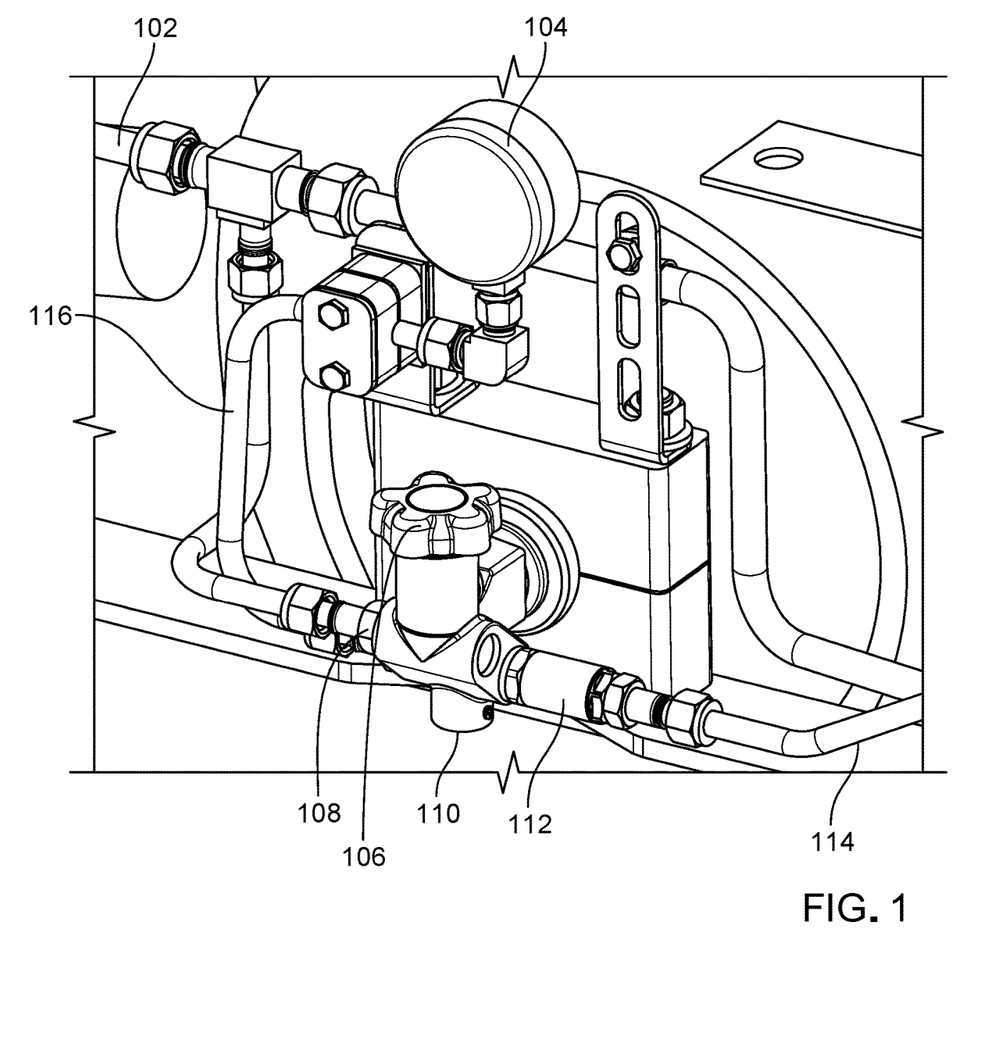
FIG. 1 depicts an example apparatus for pressure control and monitoring, according to implementations of the present disclosure.

FIG. 1 depicts an example apparatus for pressure control and monitoring, according to implementations of the present disclosure. The apparatus of FIG. 1 can also be described as a sub-assembly, and each tank in the multi-tank assembly (shown for example of FIGS. 3A and 3B) being coupled to its own dedicated sub-assembly. As shown in this example of FIG. 1, each sub-assembly can include the following components: a main supply line 102 to supply gas (e.g., CNG) to and from a tank that is coupled to the sub-assembly; a pressure gauge 104 to measure and display the pressure in the tank; a (e.g., manual) shutoff valve 106 for shutting off, or turning on, the supply to and from the tank; an inlet/outlet port 108; a plug 110; a PRD 112 as safety device to activate and vent gas from the tank through vent lines in case of a thermal event; a vent line 114 for venting gas through the PRD from the tank in case of thermal event when the PRD activates; and a live port 116.

Figure 2:
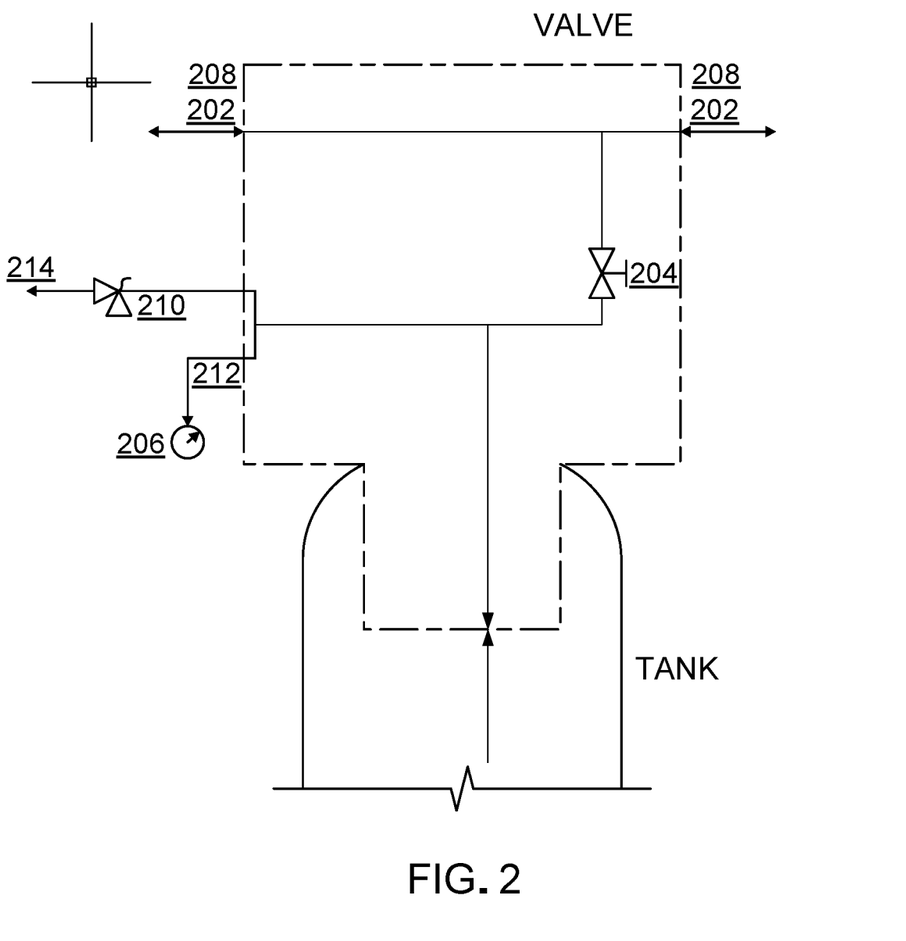
FIG. 2 depicts an example apparatus for pressure control and monitoring, according to implementations of the present disclosure.

FIG. 2 depicts an example apparatus for pressure control and monitoring, according to implementations of the present disclosure. As shown in the schematic of FIG. 2, the apparatus can include the following components: inlet port (202) (e.g., for 9/16"—18 UNF); valve (204) (e.g., manual valve); pressure gauge (206); outlet port (208) (e.g., for 9/16"—18 UNF); thermal PRD (210); live port (212); and venting pipe(s) (214). Either of ports 202 or 208 can be used as inlet port or outlet port.

Figure 3A:
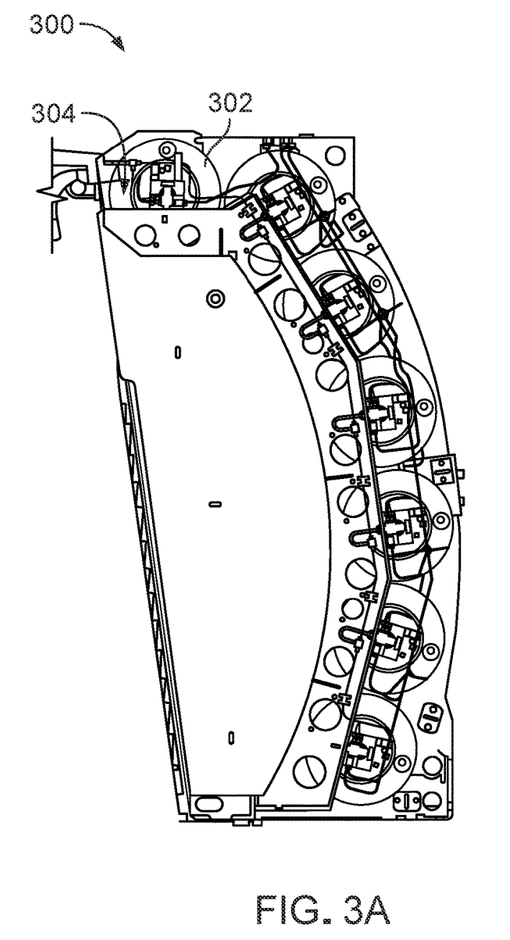
FIGS. 3A and 3B depict views of an example multi-tank assembly, according to implementations of the present disclosure.
Figure 3B:
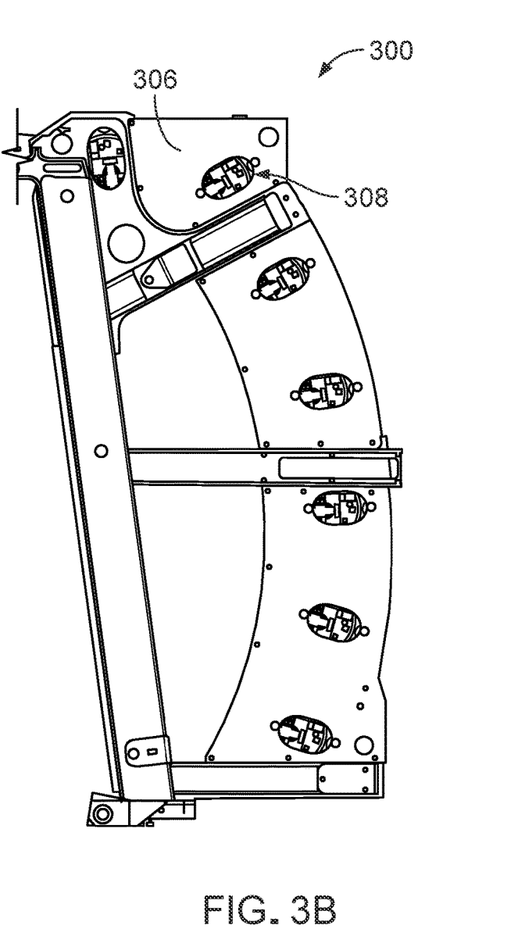

FIGS. 3A and 3B depict side views of an example multi-tank assembly, according to implementations of the present disclosure. The multi-tank assembly 300 can include any suitable number of tanks 302 to store gas (e.g., CNG). Each tank 302 may have its own dedicated sub-assembly 304 that is coupled to the tank 302, as shown in FIG. 1. FIG. 3A shows a view of the assembly without a cover. FIG. 3B shows a view of the assembly with a cover 306 that at least partly covers at least one side of the assembly 300. The cover 306 can have any suitable number of openings 308 that each provide a view to the gauge 104 of a sub-assembly 304, to enable an operator to read the pressure of the tank shown by the gauge 104.

As shown in these examples, implementations can also include suitable plumbing to connect the various components to one another. In some implementations, the assembly 300 can be attached to a tailgate of a RCV. In some instances, each tank can have a manual shutoff valve and a PRD mounted on them, and can be shipped as such an assembly by a tank manufacturer. With a different PRD setup and valve combination provided by the implementations described herein, one of the ports on the manual valve can become the live port and can be used to monitor pressure by way of the connecting tubes and pressure gauge. This can be configured individually for each tank. Implementations provide for the following: 1) a pressure gauge on each tank, and the tubes, fittings, and hardware used to connect them; 2) a sub-assembly that includes, along with the pressure gauge, a (e.g., manual) shutoff valve and PRD integrated with the valve in the sub-assembly; and 3) cutouts (e.g., openings) in the side covers 306 to make gauges visible.

When gas is filled to the tanks from a main supply line, the gas passes into the tank from the inlet/outlet port. In some examples, one of the top two ports on the valve is used as the inlet/outlet, and the other may be plugged. The tanks can all be connected in parallel. When the (e.g., manual) shutoff valve is closed, the inlet/outlet ports are also closed and the gas cannot come in or go out of the tanks. In some examples, the bottom two side ports are live at all times, even when the shutoff valve is closed, and are connected to the tank but not to the system when the valve is closed. One of the two live ports at the bottom side can be used to insert a PRD. The other port can be live all the time and can be used to read individual tank pressure when the shutoff valve is closed. When the shutoff valve is open, the gauge can show system pressure and not individual tank pressure. In some examples, there is one gauge mounted on each tank in a similar way as shown in the figure. Orientation may be varied as suitable. The bottom port can be closed with a plug. In some examples, the top two and bottom two ports of the valve are not connected to each other internally.

In some implementations, instead of manual pressure gauges electrical components can be used to monitor pressure. In some implementations, a small piece of tube can be inserted between the valve and the PRD to provide a different configuration. Some implementations may also employ a different valve and/or PRD. A different kind of mechanical/electrical pressure monitoring device can be used, as appropriate.

In previously available solutions, there is no PRD on the manual valve itself and at the other end of the CNG tank. Instead, in previously available solutions: 1) there are two PRDs connected together with a live line running from one of the valve live port; 2) there are two PRDs which are shared between two tanks; 3) all tanks are connected together with common live line; and 4) there is a common pressure gauge which indicates if there is any pressure in the tanks. These previously available solutions provide the following disadvantages: 1) given the way both PRDs are connected, in order to vent both of them have to trigger; 2) there are fewer PRDs overall to cover a greater range of area (e.g., in case of local fire); 3) it is not possible to isolate/shut down selected tanks if needed as reserve or any other purposes; 4) defueling of the complete system is required in case any maintenance or repair is needed, causing a loss of much time and waste of fuel; and 5) many live CNG lines which stay pressurized even when tank valves are closed. The implementations described herein improve on these disadvantages as described above.

Figure 4:
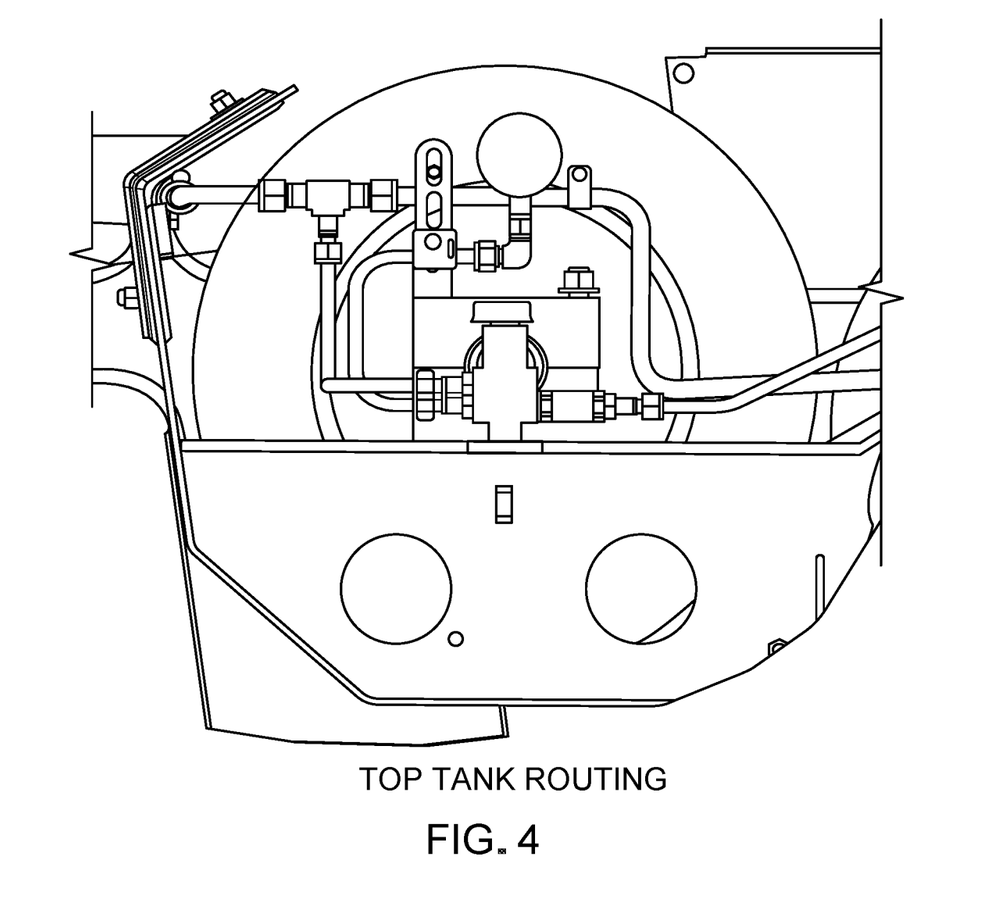
FIGS. 4-6 depict example apparatus for pressure control and monitoring, according to implementations of the present disclosure.
Figure 5:
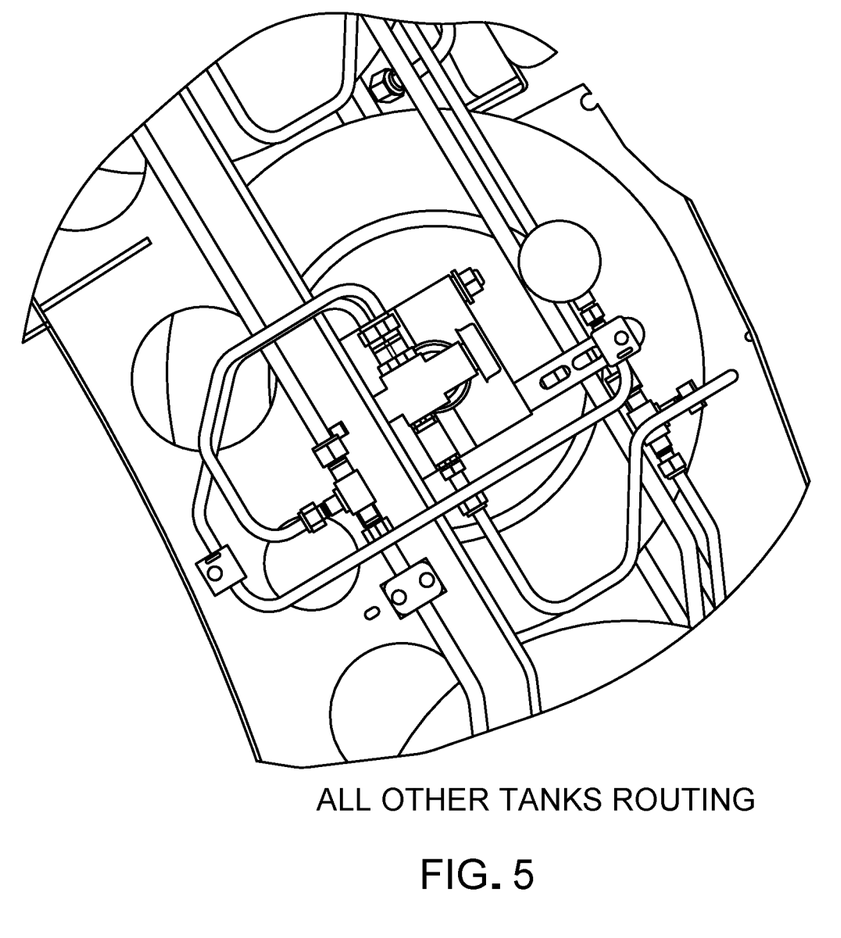
Figure 6:
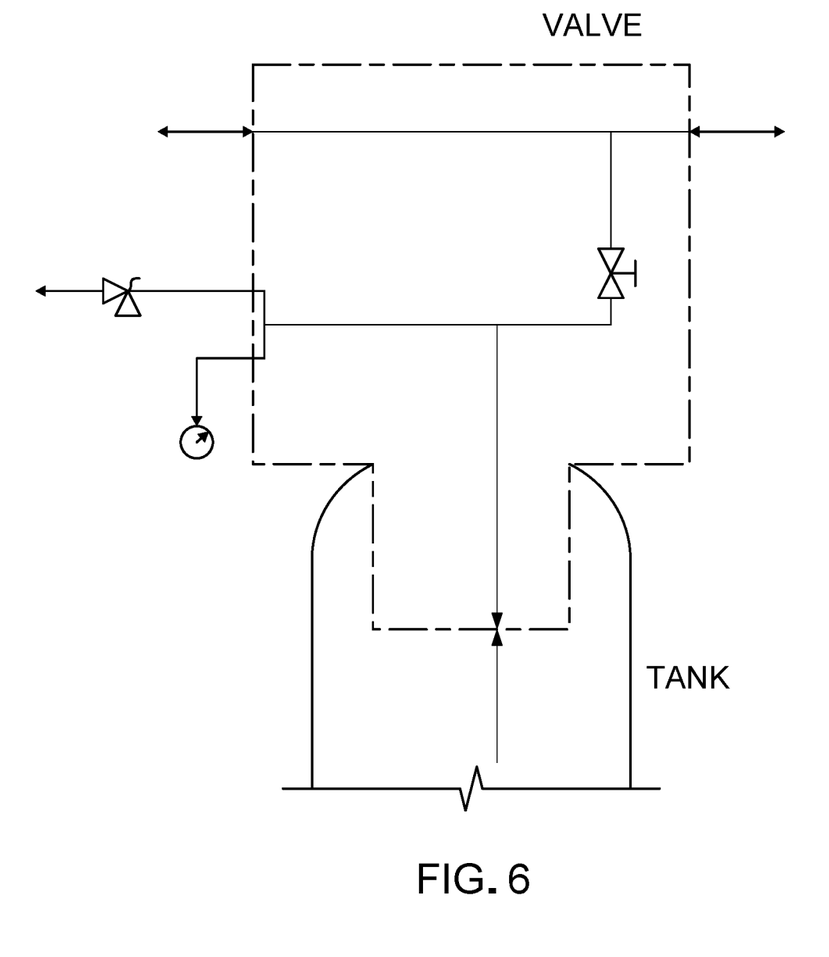

FIGS. 4-6 depict example systems for pressure monitoring and control. For example, FIGS. 4 and 5 each depict a top view of a gas tank coupled a respective example system for monitoring and controlling pressure in the gas tank.

Figure 7:
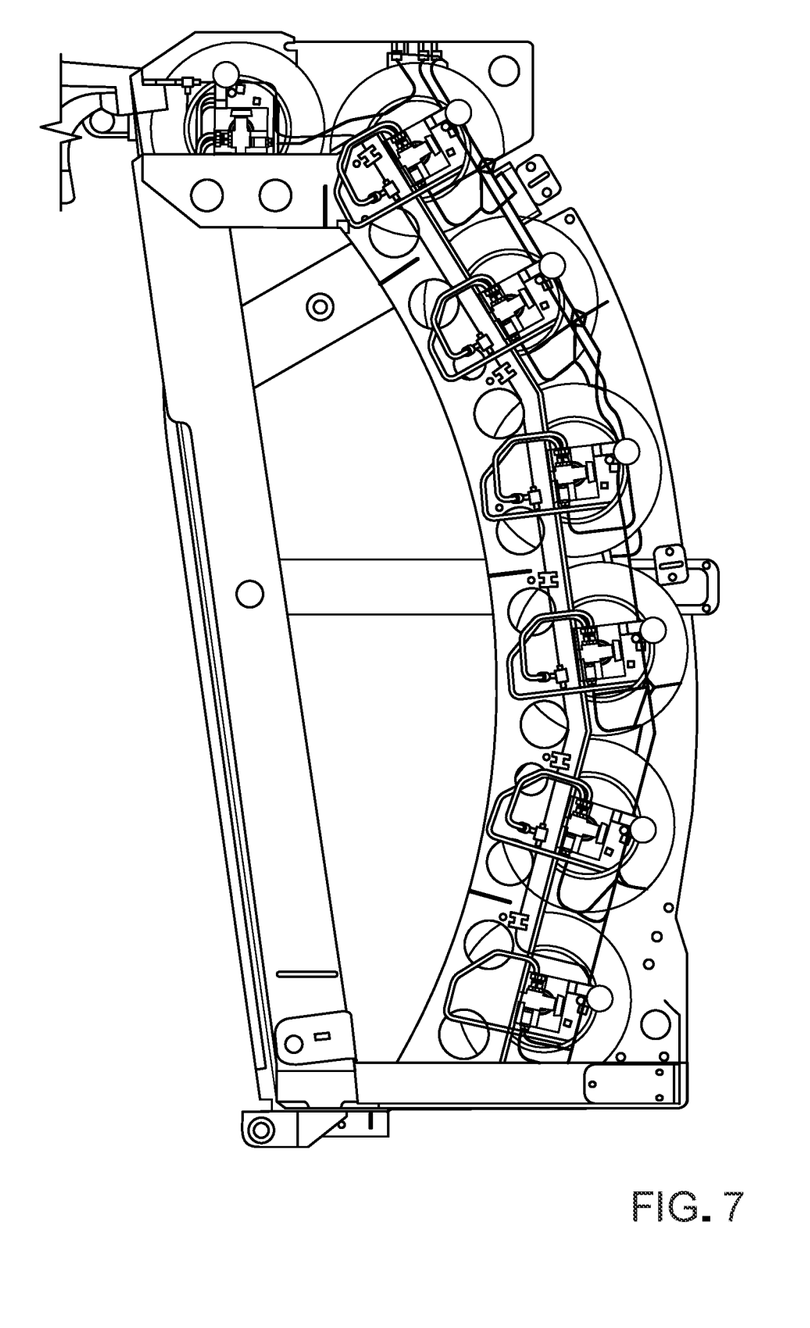
FIGS. 7 and 8 depict views of an example multi-tank assembly, according to implementations of the present disclosure.
Figure 8:
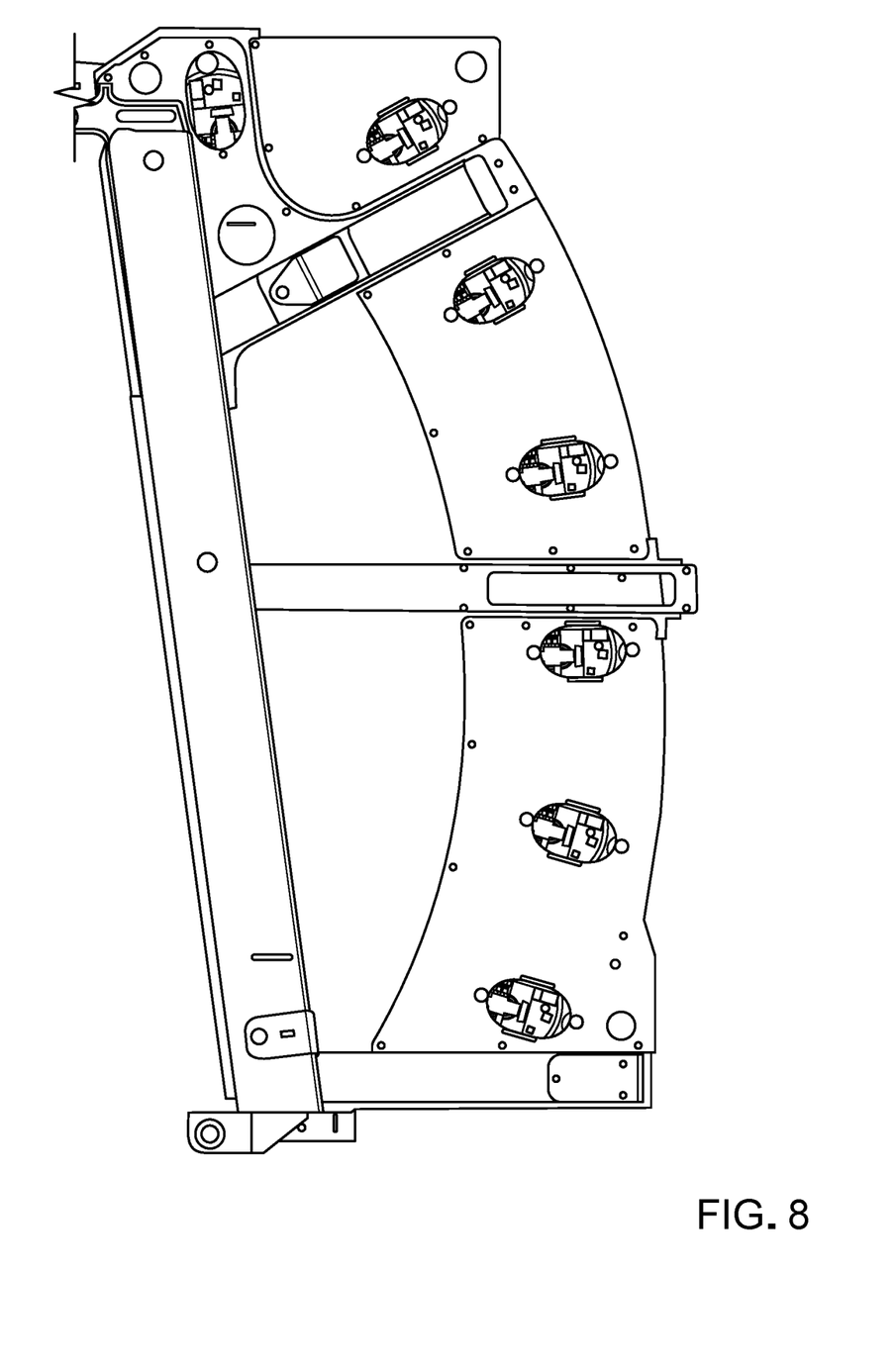

FIG. 7 shows a top view of an example system for pressure control and monitoring in a multi-tank assembly. FIG. 8 shows a top view of the assembly depicted in FIG. 7 with the addition of a cover that at least partly covers at least one side of the assembly. The cover depicted in FIG. 8 can have any suitable number of openings to enable an operator to read the pressure of the tank shown by a gauge of the system.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A gas storage assembly installed on a refuse collection vehicle, the gas storage assembly comprising:
    a plurality of gas storage tanks consisting of every gas storage tank in fluid communication with an engine of the refuse collection vehicle, each respective gas storage tank of the plurality of gas storage tanks coupled to a respective sub-assembly including:
        a shutoff valve configured to control a flow of gas to and from the respective gas storage tank, wherein the shutoff valve is in fluid communication with a pressure relief device (PRD) through a length of tubing, the PRD configured to relieve pressure in the respective gas storage tank; and
        at least one pressure gauge that measures and displays a pressure in the respective gas storage tank.

2. The gas storage assembly of claim 1, further comprising a cover that at least partly covers at least one side of the gas storage assembly, wherein the cover includes an opening to provide visibility to each respective pressure gauge.

3. The gas storage assembly of claim 1, wherein the plurality of gas storage tanks is a plurality of compressed natural gas storage tanks.

4. The gas storage assembly of claim 1, wherein the assembly is attached to a tailgate of the refuse collection vehicle.

5. The gas storage assembly of claim 1, wherein the PRD is positioned orthogonally relative to the shutoff valve.

6. The gas storage assembly of claim 1, wherein each respective sub-assembly further comprises a gas supply line coupled to the shutoff valve and configured to supply a flow of gas to and from the respective gas storage tank.

7. The gas storage assembly of claim 6, wherein each respective sub-assembly further comprises a vent line coupled to the shutoff valve and configured to vent gas from the respective gas storage tank.

8. The gas storage assembly of claim 7, wherein the gas supply line and the vent line, which are coupled to the shutoff valve, are connected in series.

9. The gas storage assembly of claim 1, wherein the sub-assembly further comprises a port coupled to the respective gas storage tank, wherein the port is configured to provide a flow of gas to the respective gas storage tank.

10. The gas storage assembly of claim 1, wherein the shutoff valve includes one or more ports, wherein a first port of the one or more ports is longitudinally aligned with the shutoff valve and is closed with a plug.

11. The gas storage assembly of claim 10, wherein a second port of the one or more ports is a live port configured to fluidically connect to a live line in fluid communication with the at least one pressure gauge.

12. The gas storage assembly of claim 11, wherein a third port of the one or more ports is an outlet port configured to fluidically connect to a gas supply line.

13. The gas storage assembly of claim 12, wherein a fourth port of the one or more ports is configured to fluidically connect to a vent line and the PRD.

14. The assembly of claim 13, wherein the fourth port is a live port configured to fluidically connect to the length of tubing separating the PRD from the shutoff valve.

15. The assembly of claim 1, wherein the respective sub-assembly includes plumbing configured to separate the pressure gauge and the PRD from the shutoff valve such that the pressure gauge and the PRD remain in fluid communication with the respective gas storage tank when the shutoff valve is closed.

16. The assembly of claim 1, wherein the plurality of gas storage tanks are fluidly connected in parallel, wherein the pressure in the respective gas storage tank measured by the pressure gauge is a system pressure across the plurality of gas storage tanks when the shutoff valve is open, and wherein the pressure in the respective gas storage tank measured by the pressure gauge is an individual pressure specific to the respective gas storage tank when the shutoff valve is closed.

17. A vehicle tank pressure control system of a refuse collection vehicle comprising:
    a plurality of shutoff valves, each shutoff valve coupled to each gas storage tank of a plurality of gas storage tanks and configured to control a flow of gas to and from the respective gas storage tank, the plurality of gas storage tanks consisting of every gas storage tank in fluid communication with an engine of the refuse collection vehicle, wherein the shutoff valve is in fluid communication with a pressure relief device (PRD) through a length of tubing, the PRD configured to relieve pressure in the respective gas storage tank; and
    one or more pressure gauges configured to measure and display a pressure of one or more gas storage tanks of the plurality of gas storage tanks.

18. The vehicle tank pressure control system of claim 17, further comprising multiple gas supply lines, each gas supply line coupled to an associated gas storage tank to supply a flow of gas to and from the associated gas storage tank.

19. The vehicle tank pressure control system of claim 17, further comprising multiple vent lines, each vent line coupled to a respective one of the pressure relief devices for coupling to an associated gas storage tank and to vent gas from the associated gas storage tank.

20. The vehicle tank pressure control system of claim 17, further comprising multiple ports, each port coupled to an associated gas storage tank to provide a flow of gas to and from the associated gas storage tank.

* * * * *

UNITED STATES PATENT AND TRADEMARK OFFICE
CERTIFICATE OF CORRECTION

| | | |
|---|---|---|
| PATENT NO. | : 11,673,467 B2 | Page 1 of 1 |
| APPLICATION NO. | : 17/557750 | |
| DATED | : June 13, 2023 | |
| INVENTOR(S) | : Nitesh S. Shroff and Stanley L. Maroney | |

It is certified that error appears in the above-identified patent and that said Letters Patent is hereby corrected as shown below:

On the Title Page

Item [*], under "Notice: Subject to any disclaimer, the term of this patent is extended or adjusted under 35 U.S.C. 154(b) by 0 days." insert --This patent is subject to a terminal disclaimer.--.

Signed and Sealed this
Thirty-first Day of October, 2023

Katherine Kelly Vidal
*Director of the United States Patent and Trademark Office*